United States Patent
Gilchrist et al.

(10) Patent No.: US 11,141,616 B1
(45) Date of Patent: Oct. 12, 2021

(54) COMBINED CAPTURE AND FIRE CONTAINMENT APPARATUS FOR PORTABLE ELECTRONIC DEVICES

(71) Applicant: HIGHWATER INNOVATIONS, LLC, Johnson City, TN (US)

(72) Inventors: Michael E. Gilchrist, Knoxville, TN (US); George H. Brilmyer, Piney Flats, TN (US); Anthony Chappell, Bristol, TN (US); Donald Anthony Coffman, Johnson City, TN (US); James W. Richardson, Jr., Bristol, TN (US)

(73) Assignee: HIGHWATER INNOVATIONS, LLC, Johnson City, TN (US)

( * ) Notice: Subject to any disclaimer, the term of this patent is extended or adjusted under 35 U.S.C. 154(b) by 425 days.

(21) Appl. No.: 16/220,026

(22) Filed: Dec. 14, 2018

(51) Int. Cl.
| | |
|---|---|
| *A62C 3/16* | (2006.01) |
| *A45C 11/00* | (2006.01) |
| *H01M 10/658* | (2014.01) |
| *H01M 50/383* | (2021.01) |
| *H01M 50/30* | (2021.01) |

(52) U.S. Cl.
CPC ............... *A62C 3/16* (2013.01); *A45C 11/00* (2013.01); *H01M 10/658* (2015.04); *H01M 50/383* (2021.01); *H01M 50/394* (2021.01); *A45C 2011/003* (2013.01)

(58) Field of Classification Search
CPC ..... A62C 3/16; A62C 3/006; A45C 2011/003; A45C 11/00; B65D 2519/0086
See application file for complete search history.

(56) References Cited

U.S. PATENT DOCUMENTS

| | | | |
|---|---|---|---|
| 576,073 A | 1/1897 | Mason | |
| 2,190,229 A | 2/1940 | Bradley | |
| 2,562,248 A | 7/1951 | Pearl | |
| 2,975,889 A | 3/1961 | Brown | |
| 3,272,580 A * | 9/1966 | Dean | A47B 63/02 312/409 |
| 4,236,463 A | 12/1980 | Westcott | |
| 4,616,694 A | 10/1986 | Hsieh | |
| 4,685,402 A | 8/1987 | Nelson et al. | |

(Continued)

FOREIGN PATENT DOCUMENTS

| | | |
|---|---|---|
| EP | 2806068 A1 | 11/2014 |
| GB | 449338 A | 6/1936 |

(Continued)

*Primary Examiner* — Andrew T Kirsch
(74) *Attorney, Agent, or Firm* — Luedeka Neely Group, PC (57) ABSTRACT

A combined capture and fire containment apparatus. The apparatus includes a telescoping rectangular prism-shaped hollow structure including a rectangular prism-shaped containment box and a rectangular prism-shaped lid portion. The lid portion is attached on opposing sides by telescoping drawer slides to the containment box. A sealing gasket is disposed on a peripheral edge of the prism-shaped lid portion to seal between the lid portion and the containment box. A latch is on an outside side portion of the lid and containment box to latch the lid portion and containment box in the closed position. A gas and fume collection filter in communication with an interior of the containment box is disposed in the lid portion. The lid portion contains a first handle disposed on an end portion of the lid portion. A second handle is disposed on a side portion of the containment box.

18 Claims, 7 Drawing Sheets

(56) References Cited

U.S. PATENT DOCUMENTS

| | | | |
|---|---|---|---|
| 5,056,603 A | 10/1991 | Parkinson | |
| 5,069,358 A | 12/1991 | Avery, Jr. | |
| 5,271,178 A | 12/1993 | Eckard | |
| 5,868,709 A | 2/1999 | Champion et al. | |
| 6,824,233 B2 | 11/2004 | Chen et al. | |
| 7,051,872 B2 | 5/2006 | Bjerregaard et al. | |
| 7,070,003 B1 | 7/2006 | Smith | |
| 7,291,784 B2 | 11/2007 | Moore et al. | |
| 7,843,689 B2 | 11/2010 | Moore et al. | |
| 7,916,487 B2 | 3/2011 | Bitton et al. | |
| 8,544,670 B2 | 10/2013 | Brilmyer | |
| 9,578,942 B2 | 2/2017 | Brilmyer et al. | |
| 2007/0000925 A1 | 1/2007 | Fortin | |
| 2009/0014188 A1* | 1/2009 | Hesch | H01M 50/24 169/48 |
| 2012/0079963 A1* | 4/2012 | Herschler | A47B 3/14 108/14 |
| 2013/0092404 A1* | 4/2013 | Mikulec | F24C 15/2021 169/65 |
| 2013/0146603 A1* | 6/2013 | Brilmyer | A62C 3/16 220/560.01 |
| 2016/0157572 A1* | 6/2016 | Brilmyer | A62C 3/00 206/557 |

FOREIGN PATENT DOCUMENTS

| | | |
|---|---|---|
| GB | 526768 A | 9/1940 |
| GB | 531387 A | 1/1941 |

\* cited by examiner

COMBINED CAPTURE AND FIRE CONTAINMENT APPARATUS FOR PORTABLE ELECTRONIC DEVICES

TECHNICAL FIELD

The disclosure relates to heat and fire containment enclosures used to isolate a fire event in portable electronic equipment that may be subject to rapid intense combustion due to malfunction of the battery (typically a Li-ion battery) or charging system therefor. More specifically the disclosure relates to a combined capture and fire containment apparatus for capturing a portable electronic device that has malfunctioned and begun to combust.

BACKGROUND AND SUMMARY

A fire containment case for use in private vehicles and on public transportation vehicles is disclosed in U.S. Pat. No. 8,544,670 and shown in FIG. 1. The fire containment case provides a secure apparatus for selectively receiving and securing a portable electronic device and their batteries in the event of malfunction and combustion of the electronic device. The case is made of heat resistance construction to contain and control products of combustion from the device.

Typically, such combustion is occurring on a more frequent basis as passengers carry more and more personal electronic devices such as cell phones, laptop computers, tablet computers, e-readers and other such devices that are powered by Li-ion batteries onto to public transportation vehicles such as planes, buses, trains, subways, etc. Combustion events occur when the battery experiences a condition referred to as thermal runaway which proceeds exceedingly rapidly making it difficult to move the portable device from its remote location to inside the containment case without endangering anyone. For example, if a battery of a portable computer malfunctions and begins to burn on an airplane, the flight attendant may be charged with safely and quickly fighting the fire and/or moving the portable computer to a fire containment location or device. However, by the time the problem is noticed and the case is retrieved from a storage location on the plane, the portable computer may be actively burning, reaching temperatures that exceed several hundred degrees centigrade. While a fire containment case is particularly useful for safely holding a portable device that may have malfunctioned and is actively burning or combusting, there is a need for an improved apparatus for capturing and containing the portable electronic device once the portable device is already burning. Since time is of the essence, there is a need for an apparatus that can capture and safely contain a portable electronic device that is actively burning so that the burning device can be handled much more safely than with any device currently available.

In view of the foregoing, an embodiment of the disclosure provides a combined capture and fire containment apparatus and methods of capturing and containing a portable electronic device that is actively burning. The apparatus includes a telescoping rectangular prism-shaped hollow structure including a rectangular prism-shaped containment box and a rectangular prism-shaped lid portion. The lid portion is attached on opposing sides by telescoping drawer slides to the containment box. A sealing gasket is disposed on a peripheral edge of the prism-shaped lid portion or on a peripheral edge of the containment box to seal between the lid portion and the containment box when the lid portion and containment box are in a closed orientation. A latch is provided on an outside side portion of the lid and contain-ment box to latch the lid portion and containment box in the closed position. A gas and fume collection filter in communication with an interior of the containment box is disposed in the lid portion. The lid portion contains a first handle disposed on an end portion of the lid portion. A second handle is disposed on a side portion of the containment box. The containment box and lid portion are insulated with a thermal flame retardant insulation.

In another embodiment there is provided a method for safely approaching and picking up a malfunctioning portable electronic device and inserting the device into a combined capture and fire containment apparatus. The method includes providing a combined capture and fire containment apparatus having a telescoping rectangular prism-shaped hollow structure including a rectangular prism-shaped containment box and a rectangular prism-shaped lid portion. The lid portion is attached on opposing sides by telescoping drawer slides to the containment box. A sealing gasket is disposed on a peripheral edge of the prism-shaped lid portion or on a peripheral edge of the containment box to seal between the lid portion and the containment box when the lid portion and containment box are in a closed orientation. A latch is provided on an outside side portion of the lid and containment box to latch the lid portion and containment box in the closed position. A gas and fume collection filter in communication with an interior of the containment box is disposed in the lid portion. A first handle is disposed on an end portion of the lid portion and a second handle is disposed on a side portion of the containment box. The containment box and lid portion are insulated with a thermal flame retardant insulation. According to the method, the lid portion is slid from a closed position to an opened position away from the containment box using the first and second handles. The portable electronic device is approached using the combined capture and fire containment apparatus as a shield. The portable electronic device is placed between the lid portion, containment box and telescoping slides. Next the lid portion of the containment box are slid toward one another to capture the malfunctioning portable electronic device in the interior of the combined capture and fire containment apparatus.

Yet another embodiment provides a method for safely approaching and picking up a malfunctioning portable electronic device and inserting the device into a combined capture and fire containment apparatus. The method includes providing a combined capture and fire containment apparatus having a telescoping rectangular prism-shaped hollow structure including a rectangular prism-shaped containment box and a rectangular prism-shaped lid portion, the lid portion being attached on opposing sides by telescoping drawer slides to the containment box. A shatter-proof window is fixedly attached on shoulder edges of opposing slides. A sealing gasket is disposed on a peripheral edge of the prism-shaped lid portion or on a peripheral edge of the containment box to seal between the lid portion and the containment box when the lid portion and containment box are in a closed orientation. A latch on an outside side portion of the lid and containment box to latch the lid portion and containment box in the closed position. A gas and fume collection filter in communication with an interior of the containment box is disposed in the lid portion. A first handle is disposed on an end portion of the lid portion and a second handle is disposed on a side portion of the containment box. The containment box and lid portion are insulated with a thermal flame retardant insulation. The method includes sliding the lid portion away from the containment box using the first and second handles; placing the combined capture and fire containment apparatus in an open position on a floor with the shatter-proof window adjacent to the floor; placing the portable electronic device between the lid portion, containment box and telescoping slides on the shatter-proof window; and sliding the lid portion and the containment box toward one another to capture the malfunctioning portable electronic device in the interior of the combined capture and fire containment apparatus.

In some embodiments, the containment box further comprises a scoop on a portion of a peripheral edge of the containment box for scooping the portable electronic device that is actively burning into the containment box.

In other embodiments, the telescoping drawer slides further comprise a shatter-proof window fixedly attached on shoulder edges of opposing slides. In still other embodiments, the shatterproof window comprises a substantially transparent polycarbonate material.

In some embodiments, the lid portion further comprises a liquid input valve in communication with the interior of the containment box.

In other embodiments, the containment box has a cavity size sufficient to contain a portable laptop computer.

In some embodiments, the portable electronic device is place on the shatter-proof window using gloves and tongs.

An advantage of the method and apparatus of the disclosed embodiments is that a malfunctioning portable electronic device can be safely captured and disposed using a combination of capture device and fire containment case much more quickly and without personnel being exposed to burn hazards associated with grabbing the portable electronic device by hand. The entire capture and containment device is sized for disposing of the burning electronic device with minimal exposure to fire and toxic fumes.

A particular advantage of the method and apparatus described herein is that it may be used to scoop up a burning electronic device from a floor or table or the electronic device may be placed on a shatterproof window of the apparatus. Accordingly, the apparatus can be used in a variety of ways that provides the most safety when handling burning electronic devices. Other features and advantages of the disclosed embodiments may be evident from the following detailed description of exemplary embodiments of the disclosure.

DETAILED DESCRIPTION OF THE INVENTION

Figure 1:
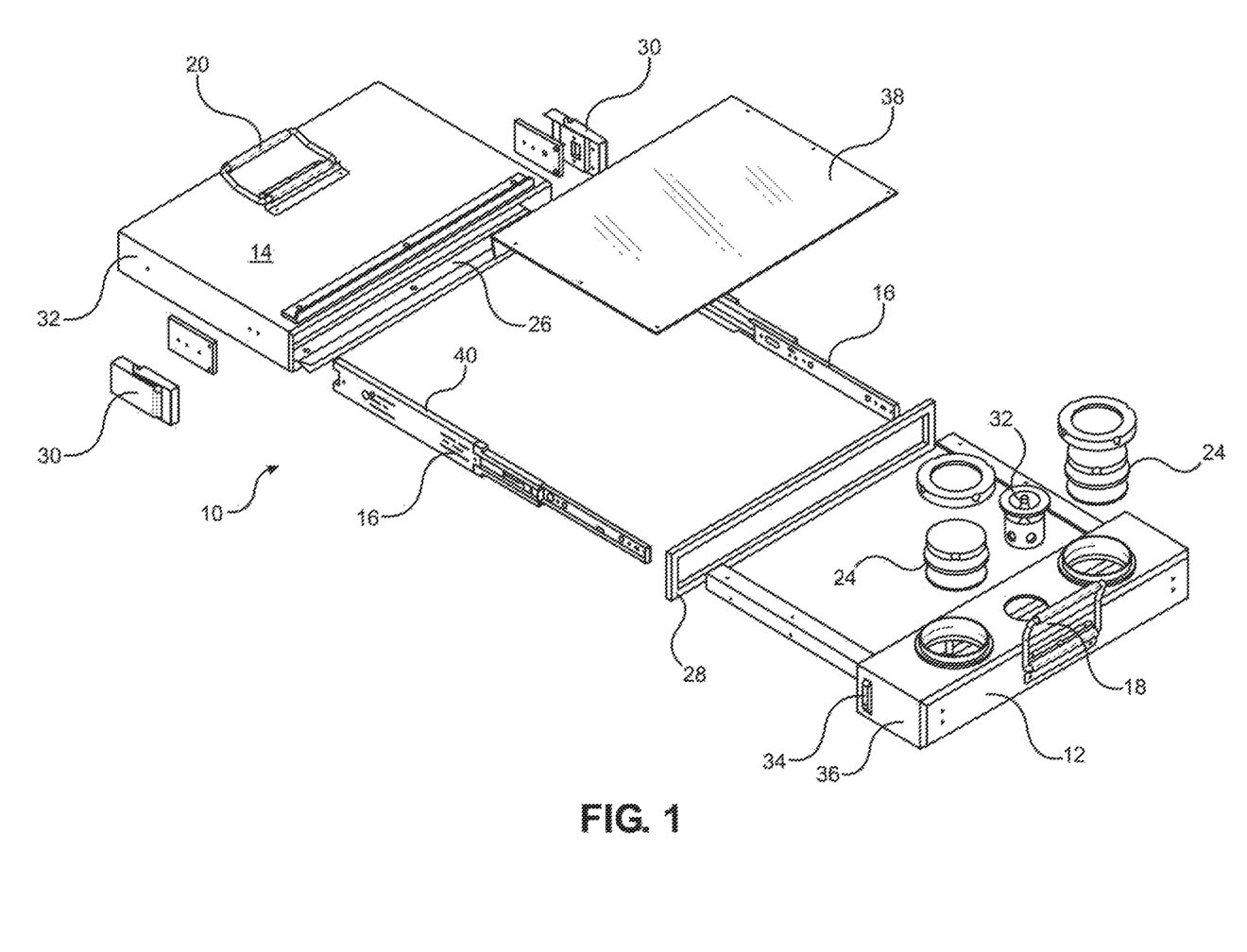
FIG. 1 is a perspective, exploded view, not to scale of a combined capture and fire containment apparatus according to the disclosure.
Figure 2:
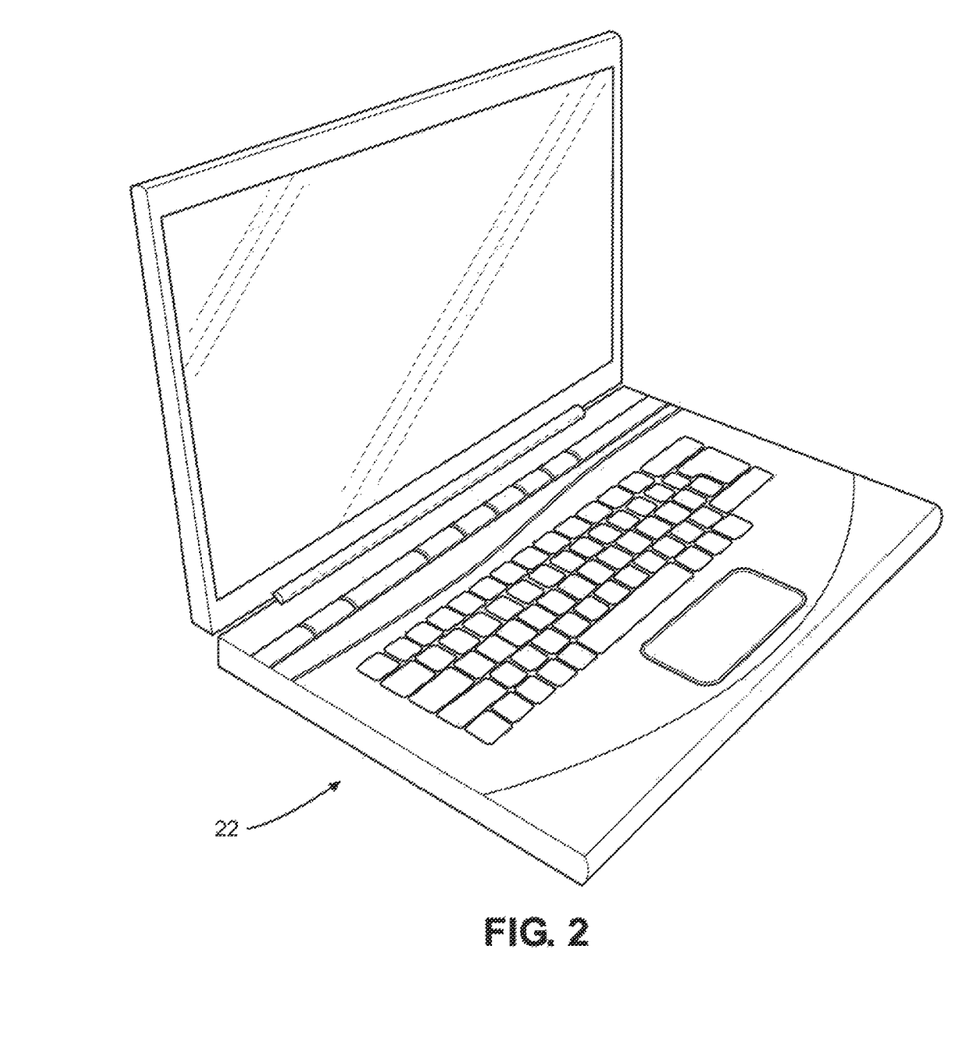
FIG. 2 is a perspective view, not to scale, of a portable electronic device for capture by the combined capture and fire containment apparatus of the disclosure.

Referring now to FIG. 1 of the drawings, a combined capture and fire containment apparatus 10 can be seen for capturing and containing a burning portable electronic device 22 (FIG. 2) such as a computer, cell phone, tablet, or other electronic device containing rechargeable batteries. The apparatus 10 has a telescoping rectangular prism-shaped lid portion 12 and a rectangular prism-shaped containment box 14. As shown in FIG. 1, the lid portion 12 is attached to the containment box 14 by a pair of telescoping drawer slides 16. The telescoping drawer slides 16 may be provided by conventional drawer slides, such as ball-bearing drawer slides or any other low friction slide mechanism. An important feature of the disclosed embodiments is that the lid portion 12 is rapidly and easily moved from an opened to a closed position and vice versa so that a burning portable electronic device 22 can be captured in as short a time as possible and disposed of in the apparatus 10.

A first handle 18 is provided on an end portion of the lid portion 12 and a second handle 20 is provided on an upper portion of the containment box 14. The first and second handles 18 and 20 are used to open and close the apparatus 10 and to place the apparatus 10 over the burning electronic device 22 to close the electronic device 22, if open, so that the burning electronic device 22 can be captured between the lid portion 12, containment box 14 and telescoping drawer slides 16 as shown in FIG. 1. The first and second handles 18 and 20 may be external handles or may be handles that are recessed into the lid portion 12 and containment box 14.

Figure 3:
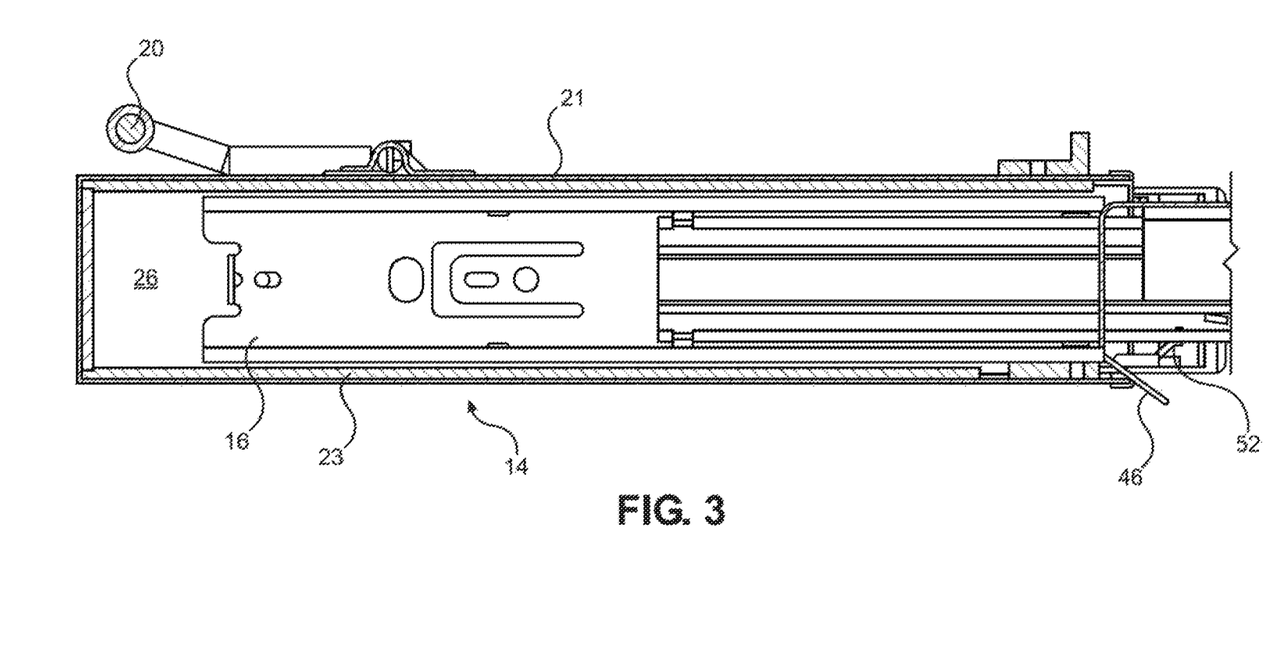
FIG. 3 is a partial cross-sectional view, not to scale, of a containment box for the combined capture and fire containment apparatus of FIG. 1.

With reference to FIG. 3, both the lid portion 12 and the containment box 14 are made of heat resistant metal 21 such as steel or aluminum and have a thermal flame retardant insulation 23 infilling between an interior surface of the lid 12 and containment box 14 and the external heat resistant metal 21 of the lid 12 and the containment box 14. The thermal insulation 23 may be of a passive static material chosen from a variety of thermal insulation materials currently available commercially or alternately of an active thermal material well known by those skilled in the art. For example, the insulation may be disposed on an interior surface of both the lid portion 12 and the containment box 14, on an exterior surface of both the lid portion 12 and containment box 14, or on the interior surface and the exterior surface of both the lid portion 12 and the containment box 14. In some embodiments, the insulation may be a heat absorbing phase change material based on inorganic salts or organic waxes that absorb heat and therefore helps to maintain a safe handling temperature for the apparatus 10.

In order to prevent toxic gases and fumes from a burning portable electronic device 22 from escaping from the combined capture and fire containment apparatus 10, one or more multi-stage filters 24 may be provided on the lid portion 12 in flow communication with an interior cavity 26 of the containment box 14 (FIG. 3). Each of the multi-stage filters 24 may include an initial particle filter, a gas fume filter and an optional chemical zone filter to collect and retain dangerous gases such as carbon monoxide and cyanide that may result from the burning of synthetic resin based materials during combustion. The filters 24 vent treated gases to atmosphere so that substantially no toxic gas or fumes are released by the burning device. In one embodiment, the filters 24 are two stage filters having a first stage containing a pleated glass fiber filter for collecting and filtering out particulates and a second stage containing activated charcoal for absorbing solvent and acid vapors, toxic fumes, and the like. It will be appreciated that additional or substitute filter elements may be used depending on changes to the chemical make-up of lithium-ion batteries used in portable electronic devices 22.

As shown in FIG. 1, a peripheral edge of the lid portion 12 contains a high temperature sealing gasket 28 that provides an airtight seal between the lid portion 12 and the containment box 14. In an alternative embodiment, the sealing gasket 28 may be attached to a peripheral edge of the containment box 14, or to both the lid portion 12 and to the containment box 14.

Figure 4:
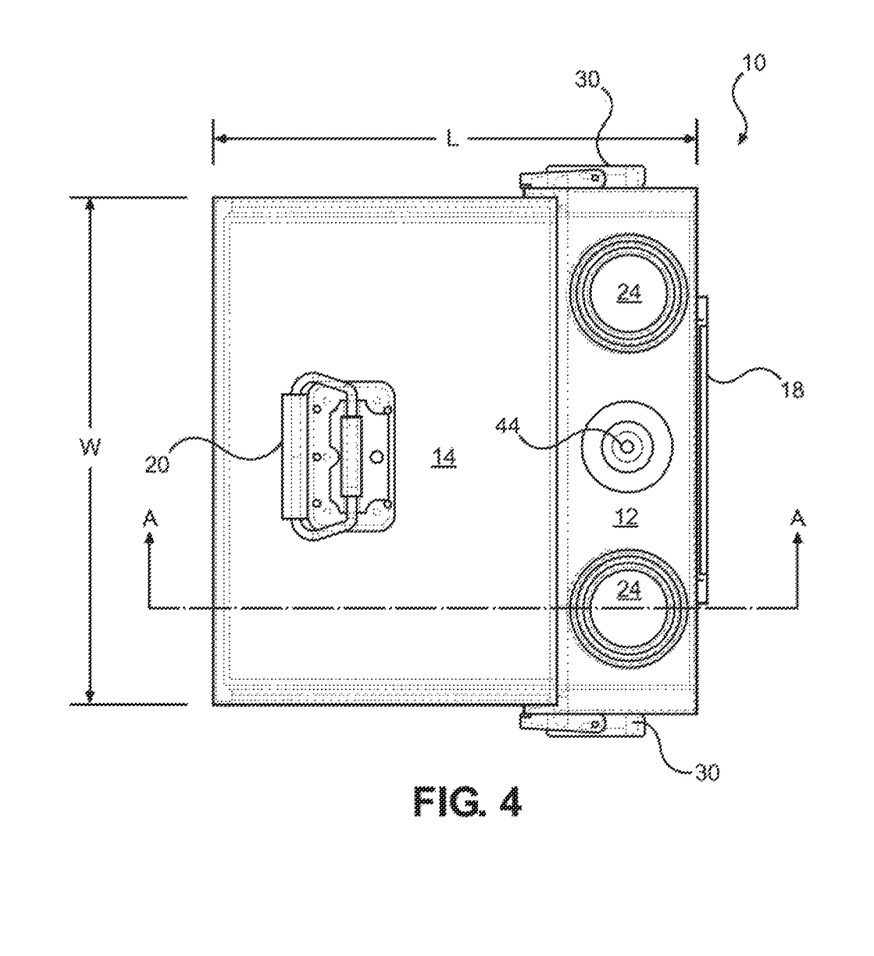
FIG. 4 is a top plan view, not to scale, of the combined capture and containment apparatus of FIG. 1.

Spring-loaded latches 30 are provided on aside portion 32 of the containment box 14 and a catch 34 may be provided on a side portion 36 of the lid portion 12. The spring-loaded latches 30 provide positive sealing between the lid portion 12 and the containment box 14 when the apparatus 10 is in a closed position as shown in FIG. 4. The apparatus 10 may be closed by using first and second handles 18 and 20 to slide the lid portion 12 toward the containment box 14 as shown in FIG. 4. Once the apparatus is closed as shown in FIG. 4, the latches 30 may be engaged.

Figure 5:
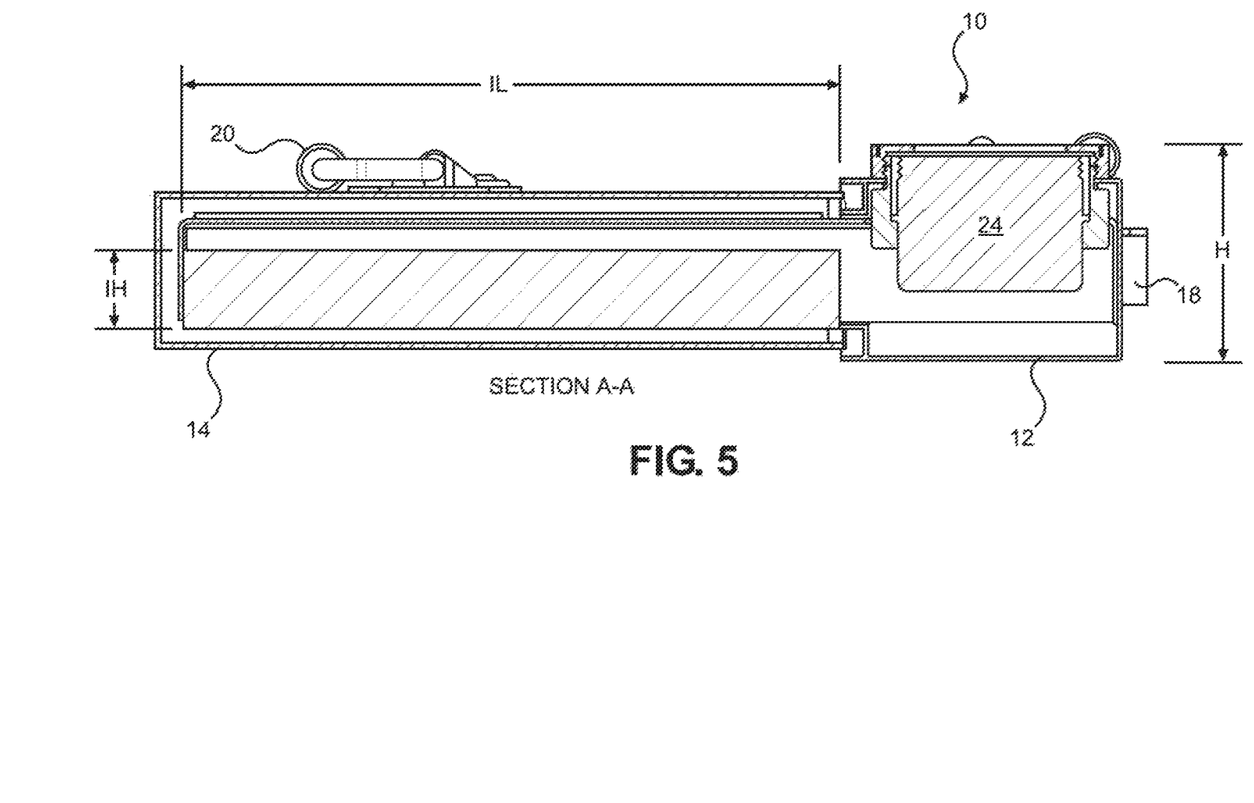
FIG. 5 is a cross-sectional view, not to scale, of the combined capture and fire containment apparatus of FIG. 4.

FIGS. 4 and 5 illustrate the overall dimensions of the apparatus 10. For example, the width (W) may range from about 30 centimeters to about 50 centimeters, a height H ranging from about 6 centimeters to about 10 centimeters and a length L may range from 30 to 45 centimeters. The interior 26 of the containment box 14 for holding the burning portable electronic device may have an interior height (IH) of from about 2.5 to about 5 centimeters and an interior length (IL) ranging from about 20 to about 30 centimeters.

With further reference to FIG. 1, in some embodiments, a shatter-proof window 38 is attached to shoulder edges 40 of the drawer slides 16. The shatter-proof window may be made from a wide variety of materials, including but not limited to, a substantially transparent polycarbonate material. Accordingly, the apparatus 10 may be used to capture a burning portable electronic device 22 that is on a floor or table with the apparatus 10 being used in an upright position as shown in FIGS. 6 and 7, or tongs or heat resistant gloves may be used to place the burning electronic device 22 onto the shatter-proof window 38 with the apparatus 10 being used in an inverted position as shown in FIGS. 8 and 9.

Figure 6:
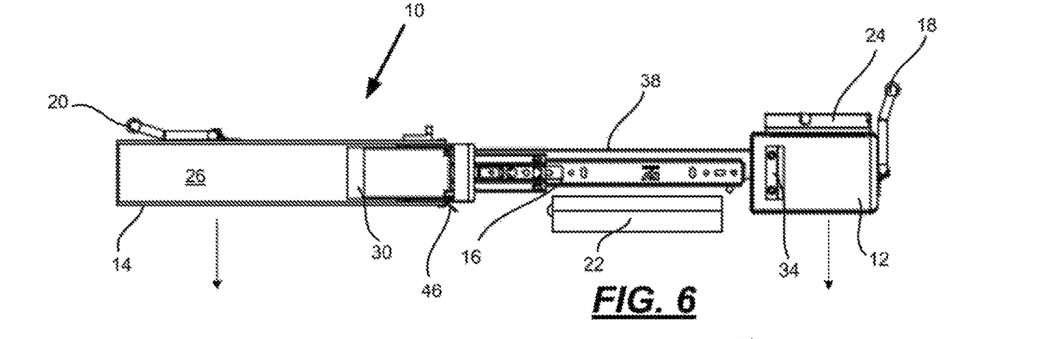
FIGS. 6-9 illustrate sequences of using the combined capture and fire containment apparatus of FIG. 1 according to another embodiment of the disclosure.
Figure 7:
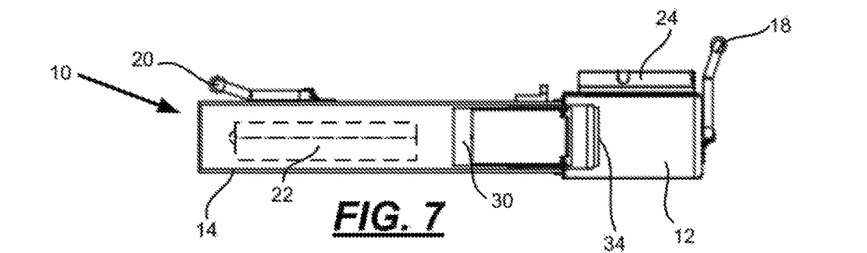

When the burning portable electronic device 22 is on a floor or table, the apparatus 10 is opened, as shown in FIG. 6 using first and second handles 18 and 20 so that the burning portable electronic device 22 can be seen through the shatter-proof window 38 and so that the shatter-proof window 38 shields the user from the burning portable electronic device 22 in case the device explodes. Once the burning electronic device 22 is safely between the lid portion 12, containment box 14 and telescoping drawer slides 16, the first and second handles 18 and 20 may be used to quickly close the apparatus 10 so that the spring loaded latches 30 may be engaged with the catches 34 on the sides of the apparatus 10 as shown in FIG. 7.

Figures 10, 11:
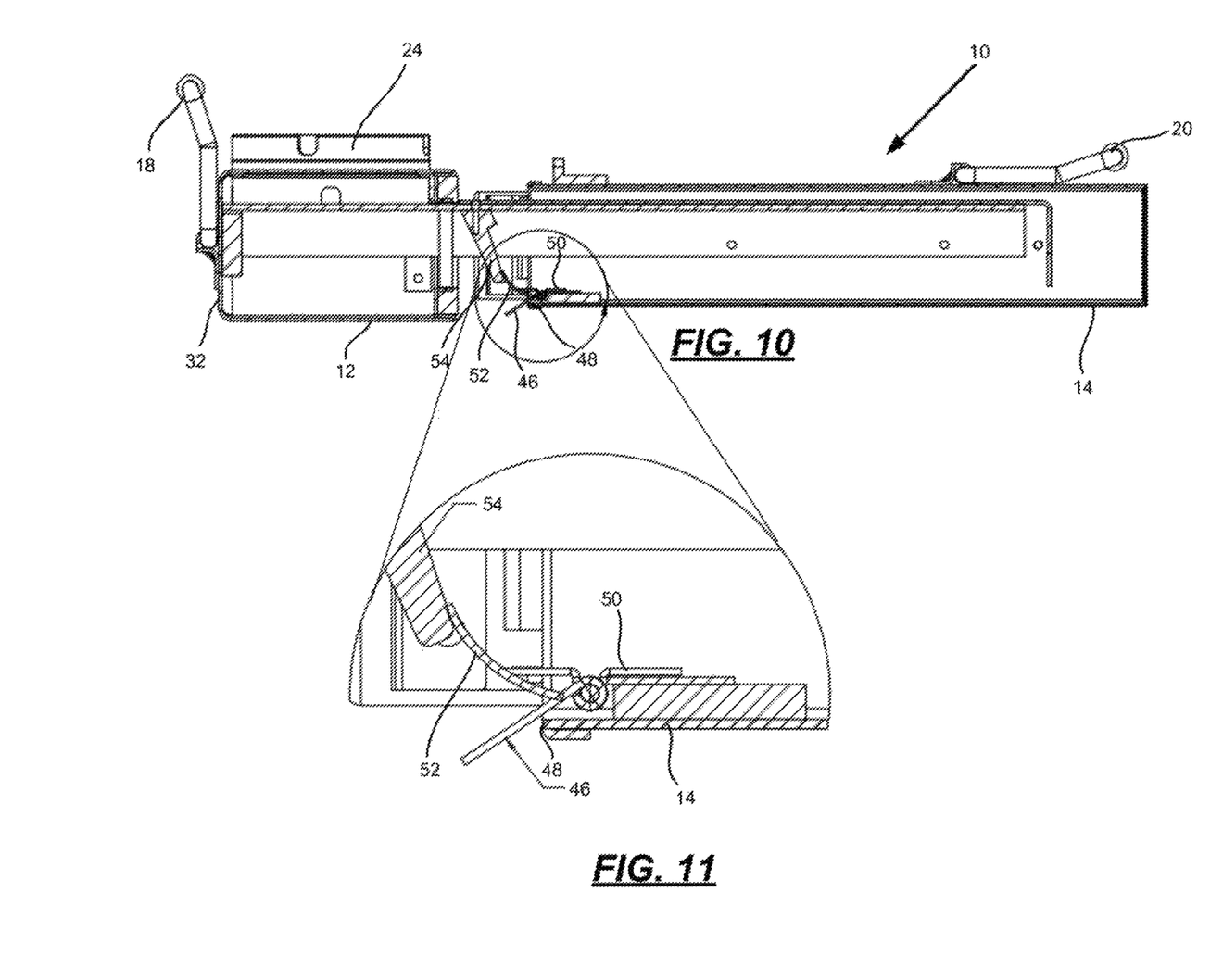
FIG. 10 is a cross-sectional view, not to scale, of the apparatus of FIG. 1 showing details of a scoop for the apparatus of FIG. 1 when the apparatus is in a partially open position.
FIG. 11 is a partial cross-sectional, close-up view, not to scale, of the scoop mechanism of FIG. 10.

FIGS. 10-11 illustrate a spring loaded pivotal scoop 46 attached to a peripheral edge 48 of the containment box 14. The scoop 46 includes a spring 50 and a curved finger 52 attached to the scoop 48. The curved finger 52 engages a fixed finger 54 attached to the lid portion 12 for raising the scoop 48 when the lid portion 12 is slid adjacent to the containment box 14 in a closed position. The fixed finger 54 is attached to the lid portion 12 and engages the curved finger 52 when the apparatus 10 is closed to cause the scoop 46 to raise. The scoop 46 is configured to assist in lifting the burning portable electronic device 22 off of the floor or table so that it can be more easily captured and moved into the interior 26 of the apparatus 10 between the lid portion 12, containment box 14, and telescoping slides 16 when the apparatus is closed as shown in FIGS. 6-7. The spring 50 causes the scoop 46 to deploy in a scooping orientation when the apparatus 10 is opened as shown in the close-up portion of the mechanism in FIG. 11.

Figure 8:
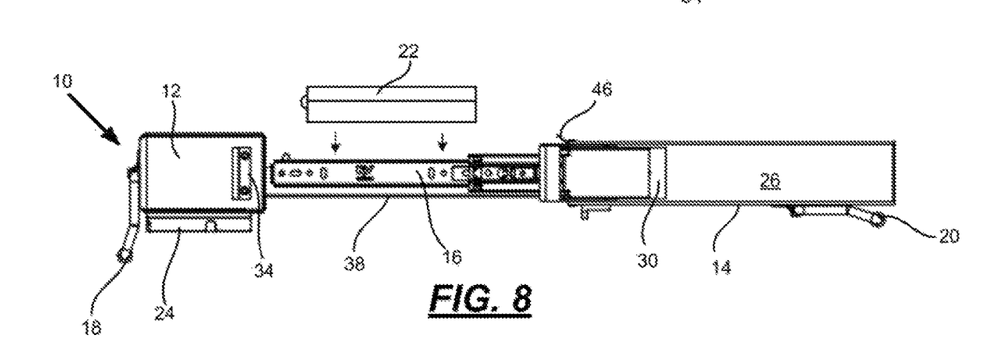
Figure 9:
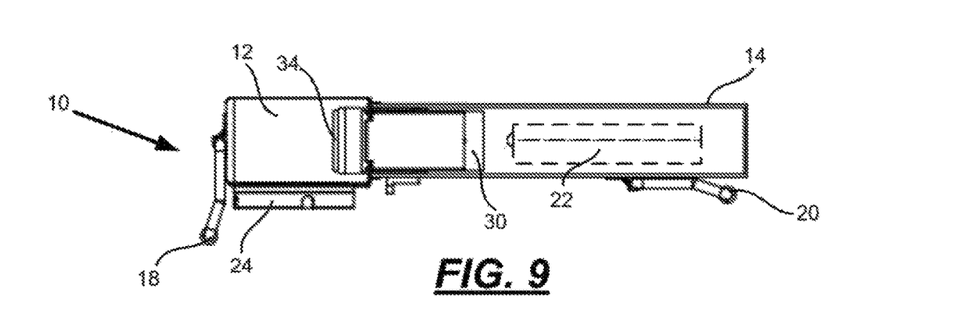

An alternate method of using the apparatus includes placing burning electronic device is place on the shatter-proof window 38 as shown in FIG. 8, then closing the apparatus 10 by pushing the lid portion 12 and the containment box portion 14 together as shown in FIG. 9. Once completely closed, and the latches 30 are latched, the gasket 28 provides an air tight seal to prevent toxic fumes and gases from escaping from the apparatus 10 as the portable electronic device 22 burns. Likewise, the multistage filters 24 filter out any toxic gases, fumes and particles that might be generated by the burning portable electronic device 22.

In some embodiments, as shown in FIG. 1, a fluid valve 44 may be disposed in the lid portion 12 in order to flow water or other fire suppressant materials into the interior 26 of the containment box 14 from a fluid source such as a bottle or other fluid container. Fire suppressant materials may be selected from flame retardant foams, and halogenated flame retardant fire extinguishing materials.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A combined capture and fire containment apparatus for safely capturing and containing a portable electronic device that is actively burning, the apparatus comprising,
    a telescoping rectangular prism shaped hollow structure including a rectangular prism-shaped containment box and a rectangular prism-shaped lid portion, the lid portion being attached on opposing sides by telescoping drawer slides to the containment box, wherein the containment box and lid portion are insulated with a thermal flame retardant insulation,
    a sealing gasket disposed on a peripheral edge of the prism-shaped lid portion or on a peripheral edge of the containment box to seal between the lid portion and the containment box when the lid portion and containment box are in a closed orientation,
    a latch on an outside side portion of the lid and containment box to latch the lid portion and containment box in the closed position, a gas and fume collection filter in communication with an interior of the containment box disposed in the lid portion,
a first handle disposed on an end portion of the lid portion,
a second handle disposed on a side portion of the containment box.

2. The combined capture and fire containment apparatus of claim 1, wherein the containment box further comprises a fixed or retractable guide on a portion of a peripheral edge of the containment box for scooping the portable electronic device that is actively burning into the containment box.

3. The combined capture and fire containment apparatus of claim 1, wherein the telescoping drawer slides further comprise a shatter-proof window fixedly attached on shoulder edges of opposing slides.

4. The combined capture and fire containment apparatus of claim 3, wherein the shatterproof window comprises a substantially transparent polycarbonate material.

5. The combined capture and fire containment apparatus of claim 1, wherein the lid portion further comprises a liquid input valve in communication with the interior of the containment box.

6. The capture apparatus of claim 1, wherein the containment box has a cavity size sufficient to contain a portable laptop computer.

7. The capture apparatus of claim 1, wherein the first handle is recessed in the lid portion and the second handle is recessed in the containment box.

8. The capture apparatus of claim 1, wherein the insulation is disposed internally with respect to the lid portion and the containment box, externally with regard to the lid portion and containment box, or both internally and externally with regard to the lid portion and containment box.

9. The capture apparatus of claim 1, wherein the lid portion and containment box are lined internally with a heat absorbing phase change material.

10. A method for safely approaching and picking up a malfunctioning portable electronic device and inserting the device into a combined capture and fire containment apparatus, comprising:
providing a combined capture and fire containment apparatus comprising,
a telescoping rectangular prism-shaped hollow structure including a rectangular prism-shaped containment box and a rectangular prism-shaped lid portion, the lid portion being attached on opposing sides by telescoping drawer slides to the containment box,
a sealing gasket disposed on a peripheral edge of the prism-shaped lid portion or on a peripheral edge of the containment box to seal between the lid portion and the containment box when the lid portion and containment box are in a closed orientation,
a latch on an outside side portion of the lid and containment box to latch the lid portion and containment box in the closed position,
a gas and fume collection filter in communication with an interior of the containment box disposed in the lid portion,
a first handle disposed on an end portion of the lid portion,
a second handle disposed on a side portion of the containment box,
wherein the containment box and lid portion are insulated with a thermal flame retardant insulation;
sliding the lid portion from a closed position to an opened position;
approaching the portable electronic device using the combined capture and fire containment apparatus as a shield;
opening the combined capture and fire containment apparatus by sliding the lid portion away from the containment box using the first and second handles;
placing the portable electronic device between the lid portion, containment box and telescoping slides; and
sliding the lid portion and the containment box toward one another using the first and second handles to capture the malfunctioning portable electronic device in the interior of the combined capture and fire containment apparatus.

11. The method of claim 10, wherein the containment box comprises a scoop on a portion of a peripheral edge of the containment box for scooping the portable electronic device the containment box as the lid portion and containment box are slid toward one another.

12. The method of claim 10, wherein the telescoping drawer slides comprise a shatter-proof window fixedly attached on one of the side edges of opposing slides to shield the portable electronic device from a user.

13. The method of claim 12, wherein the shatterproof window comprises a substantially transparent polycarbonate material.

14. The method of claim 10, wherein the lid portion comprises a liquid input valve in communication with the interior of the containment box.

15. A method for safely approaching and picking up a malfunctioning portable electronic device and inserting the device into a combined capture and fire containment apparatus, comprising:
providing a combined capture and fire containment apparatus comprising,
a telescoping rectangular prism-shaped hollow structure including a rectangular prism-shaped containment box and a rectangular prism-shaped lid portion, the lid portion being attached on opposing sides by telescoping drawer slides to the containment box, wherein the slides have a shatter-proof window fixedly attached on shoulder edges of opposing slides,
a sealing gasket disposed on a peripheral edge of the prism-shaped lid portion or on a peripheral edge of the containment box to seal between the lid portion and the containment box when the lid portion and containment box are in a closed orientation,
a latch on an outside side portion of the lid and containment box to latch the lid portion and containment box in the closed position,
a gas and fume collection filter in communication with an interior of the containment box disposed in the lid portion,
a first handle disposed on an end portion of the lid portion,
a second handle disposed on a side portion of the containment box, wherein the containment box and lid portion are insulated with a thermal flame retardant insulation;
sliding the lid portion from a closed position to an opened position;
opening the combined capture and fire containment apparatus by sliding the lid portion away from the containment box using the first and second handles;
placing the combined capture and fire containment apparatus in an open position on a floor with the shatterproof window adjacent to the floor;

placing the portable electronic device between the lid portion, containment box and telescoping slides on the shatter-proof window;

sliding the lid portion and the containment box toward one another to capture the malfunctioning portable electronic device in the interior of the combined capture and fire containment apparatus.

16. The method of claim 15, wherein the shatterproof window comprises a substantially transparent polycarbonate material.

17. The method of claim 15, wherein the portable electronic device is placed on the shatter-proof window using gloves and tongs.

18. The method of claim 15, wherein the lid portion comprises a liquid input valve in communication with the interior of the containment box.

* * * * *